United States Patent
Tomita et al.

(10) Patent No.: US 8,105,537 B2
(45) Date of Patent: Jan. 31, 2012

(54) FUEL QUALITY EVALUATION APPARATUS, FUEL QUALITY EVALUATION METHOD AND RECORDING MEDIUM

(75) Inventors: Eiji Tomita, Okayama (JP); Hiroshi Morinaka, Okayama (JP)

(73) Assignee: National University Corporation Okayama University, Okayama-shi (JP)

( * ) Notice: Subject to any disclaimer, the term of this patent is extended or adjusted under 35 U.S.C. 154(b) by 648 days.

(21) Appl. No.: 12/223,300

(22) PCT Filed: Feb. 1, 2007

(86) PCT No.: PCT/JP2007/051738
§ 371 (c)(1),
(2), (4) Date: Jul. 28, 2008

(87) PCT Pub. No.: WO2007/088950
PCT Pub. Date: Aug. 9, 2007

(65) Prior Publication Data
US 2009/0038373 A1 Feb. 12, 2009

(30) Foreign Application Priority Data

Feb. 1, 2006 (JP) ................................ 2006-024908
Nov. 24, 2006 (JP) ................................ 2006-316892

(51) Int. Cl.
*G01N 31/12* (2006.01)
(52) U.S. Cl. .......................... 422/78; 73/23.31; 60/803
(58) Field of Classification Search ................... 422/78; 73/23.31; 60/803
See application file for complete search history.

(56) References Cited

U.S. PATENT DOCUMENTS

| 5,126,721 A * | 6/1992 | Butcher et al. ................ 340/578 |
| 7,289,032 B2 * | 10/2007 | Seguin et al. ................. 340/578 |
| 2004/0089810 A1 * | 5/2004 | Brown et al. ............. 250/339.15 |
| 2005/0129578 A1 * | 6/2005 | Olstowski ....................... 422/78 |
| 2005/0247066 A1 * | 11/2005 | Myhre ............................ 60/803 |

FOREIGN PATENT DOCUMENTS

| JP | A-62-282139 | 12/1987 |
| JP | A-06-288285 | 10/1994 |
| JP | A-07-244038 | 9/1995 |
| JP | A-2001-329906 | 11/2001 |
| JP | A-2002-350334 | 12/2002 |
| JP | A-2005-036652 | 2/2005 |
| JP | A-2006-322437 | 11/2006 |

* cited by examiner

*Primary Examiner* — Michael Marcheschi
*Assistant Examiner* — Jonathan Hurst
(74) *Attorney, Agent, or Firm* — Oliff & Berridge, PLC

(57) ABSTRACT

A fuel quality evaluation apparatus and evaluation method enable a reliable evaluation at a low cost. The apparatus includes a combustion chamber which causes an injected fuel to combust, temperature control means which adjusts an interior temperature of the combustion chamber before injection, injection control means which controls the injection, light intensity measurement means which measures flame combustion light intensity, and analysis means which analyzes the measurement result and evaluates a fuel quality. The analysis means causes the fuel to combust a plurality of times, identifies a transformation of a flame light intensity, and evaluates the quality of the fuel based on a variation in the light intensity transformations for each combustion.

4 Claims, 12 Drawing Sheets

FUEL QUALITY EVALUATION APPARATUS, FUEL QUALITY EVALUATION METHOD AND RECORDING MEDIUM

TECHNICAL FIELD

The present invention relates to a fuel quality evaluation apparatus, fuel quality evaluation method, and recording medium used in a quality inspection of a petroleum fuel, such as a heavy oil used in a diesel engine or the like, or a liquid fuel such as an alcohol-based fuel.

BACKGROUND ART

Recently, as a fuel of a marine diesel engine centered on an ocean-going vessel, a so-called heavy oil C, which is a residual oil appearing in conjunction with an oil refinement, is generally used. The heavy oil which is used in the marine diesel engine in this way is also called a bunker oil.

The ocean-going vessel calls in at ports in countries other than its own country, and carries out a replenishing of fuel in the ports, but as oil refinement methods differ according to the country, a quality of a residual oil which is to be the fuel differs in each country, and there has been a danger of the marine diesel engine being damaged in a case of replenishing with a fuel of an inferior quality.

In particular, with the marine diesel engine, an occurrence of a scuffing has been known as that which causes the most serious damage. The scuffing being a damage, such as a scratching of a cylinder wall, occurring due to a piston and a cylinder sliding in a condition in which there is a lack of a lubricant, in some cases, there has been a danger of it leading to a damage to the marine diesel engine.

Therein, as a method of checking a quality of a replenishing fuel, an inspection apparatus which inspects the quality of the fuel has been proposed by Fuel Tech, Inc. With the inspection apparatus, the fuel being caused to combust in a combustion chamber, and a combustion condition being detected from a pressure change in the combustion chamber at the time of the combustion, in particular, focusing on an ignition lag, which is a time from injecting the fuel into the combustion chamber until the injected fuel ignites, a fuel quality evaluation is carried out.

With Fuel Tech, Inc.'s inspection apparatus, the detection of the combustion condition is carried out based on the pressure change in the combustion chamber, but recently, an evaluation method has been proposed which, directly observing the combustion condition by mounting a heat resistant, transparent glass, such as a quartz glass, on the combustion chamber, providing an observation window, and photographing the combustion condition inside the combustion chamber through the observation window with a high speed camera or the like, evaluates the quality of the fuel from a length of a flame or a length of an after burning time (for example, refer to Patent Document 1).
Patent Document 1: JP-A-2001-329906

DISCLOSURE OF THE INVENTION

Problems the Invention is to Solve

However, when only detecting the pressure change in the combustion chamber, in the way of the inspection apparatus made by Fuel Tech, Inc., there has been a danger of not being able to correctly evaluate the fuel combustion condition.

Meanwhile, in the case of providing the observation window in the combustion chamber, enabling the direct observation of the combustion condition with the high speed camera or the like, and evaluating the quality of the fuel from only the observed combustion condition, although it is possible to reliably check the combustion condition for a specified time, it has happened that a temporal resolution is insufficient.

That is, even supposing that a high speed recording is made at, for example, 2000 frames per second using a general high speed camera, only a temporal resolution of 0.5 milliseconds being acquired, this has not been sufficient to observe the combustion condition, which is of only around a few tens of milliseconds. Therein, although it is sufficient to use a faster high speed camera in order to carry out a more accurate evaluation, as the high speed camera is extremely expensive in that case, there has been a problem in that it becomes inappropriate from a cost aspect for the inspection apparatus to be widely, generally utilized.

While bearing in mind this kind of current situation, the inventor has carried out research and development in order to provide an evaluation apparatus which more accurately enables a reliable evaluation, culminating in contriving the invention.

Means for Solving the Problems

The fuel quality evaluation apparatus of the invention includes: a combustion chamber which causes a fuel injected from an injection nozzle to combust; temperature control means which adjusts a temperature of an interior of the combustion chamber before an injection of the fuel; injection control means which controls the injection of the fuel from the injection nozzle; light intensity measurement means which measures a light intensity of a flame caused by a combustion in the interior of the combustion chamber; and analysis means which analyses a result of a measurement with the light intensity measurement means, and evaluates a quality of the fuel, wherein the analysis means, controlling the temperature control means and the injection control means, causes the fuel to combust a plurality of times with the interior of the combustion chamber at a predetermined temperature, identifies a transformation of a flame light intensity which increases along with an elapsing of time after a start of the combustion, and evaluates the quality of the fuel based on a variation in the light intensity transformations for each combustion.

Furthermore, the fuel quality evaluation apparatus of the invention is also characterized in that the analysis means, controlling the temperature control means and the injection control means, as well as causing the fuel to combust a plurality of times with the interior of the combustion chamber at a first temperature, causes the fuel to combust a plurality of times with the interior of the combustion chamber at a second temperature, which differs from the first temperature, and evaluates the quality of the fuel based on a variation in the individual light intensity transformations for each combustion.

Also, the fuel quality evaluation method of the invention, in a fuel quality evaluation method which injects the fuel into the combustion chamber and causes it to combust, detects the light intensity of the flame appearing due to the combustion with the light intensity measurement means, and evaluates the quality of the fuel based on the light intensity, causes the fuel to combust a plurality of times with a temperature of an interior of the combustion chamber at a predetermined temperature, identifies each transformation of a flame light intensity which increases along with an elapsing of time after a start of the combustion, and evaluates the quality of the fuel based on a variation in the light intensity transformations for each combustion.

Furthermore, with the fuel quality evaluation method of the invention, in a fuel quality evaluation method which injects a fuel into a combustion chamber and causes it to combust, detects a light intensity of a flame appearing due to the combustion with light intensity measurement means, and evaluates a quality of the fuel based on the light intensity, as well as causing the fuel to combust a plurality of times with a temperature of an interior of the combustion chamber at a first temperature, causes the fuel to combust a plurality of times with the temperature of the interior of the combustion chamber at a second temperature, which differs from the first temperature, identifies each transformation of a flame light intensity which increases along with an elapsing of time after a start of the combustion, and evaluates the quality of the fuel based on a variation in the light intensity transformations for each combustion.

Also, with the controller readable recording medium of the invention, it is taken to be a controller readable recording medium on which is recorded a fuel quality evaluation program for causing the controller to execute: a step of causing a fuel to combust a plurality of times with a temperature of an interior of a combustion chamber at a predetermined temperature; a step of detecting with light intensity measurement means a flame light intensity which increases along with an elapsing of time after a start of the combustion, and identifying each transformation of the light intensity, and a step of evaluating a quality of the fuel based on a variation in the light intensity transformations for each combustion.

Furthermore, with the controller readable recording medium of the invention, it is taken to be a controller readable recording medium on which is recorded a fuel quality evaluation program for causing the controller to execute: a step of causing a fuel to combust a plurality of times with a temperature of an interior of a combustion chamber at a first temperature; a step of detecting with light intensity measurement means a flame light intensity which increases along with an elapsing of time after a start of the combustion, and identifying each transformation of the light intensity; a step of evaluating a quality of the fuel based on a variation in the light intensity transformations for each combustion; a step of causing the fuel to combust a plurality of times with the temperature of the interior of the combustion chamber at a second temperature, which differs from the first temperature; a step of detecting with the light intensity measurement means a flame light intensity which increases along with an elapsing of time after a start of the combustion, and identifying each transformation of the light intensity, and a step of evaluating the quality of the fuel based on a variation in the light intensity transformations for each combustion.

Advantage of the Invention

According to the invention, by causing the fuel whose quality is to be evaluated to combust a plurality of times inside the combustion chamber at the predetermined temperature, detecting individual light intensity transformations of the flames appearing in conjunction with the combustions, and evaluating the quality of the fuel based on the variation in the transformations, it is possible to enable a highly reliable quality evaluation.

In particular by, as well as causing the fuel to combust a plurality of times with the temperature inside the combustion chamber at the first temperature, causing the fuel to combust a plurality of times with the temperature inside the combustion chamber at the second temperature, which differs from the first temperature, it being possible to clearly carry out an evaluation of a fuel positioned in a grey zone, which is a border between a conforming article and a non-conforming article, which to date has been difficult to evaluate, it is possible to considerably increase a reliability of an evaluation result.

DESCRIPTION OF REFERENCE NUMERALS AND SIGNS

Figure 1:
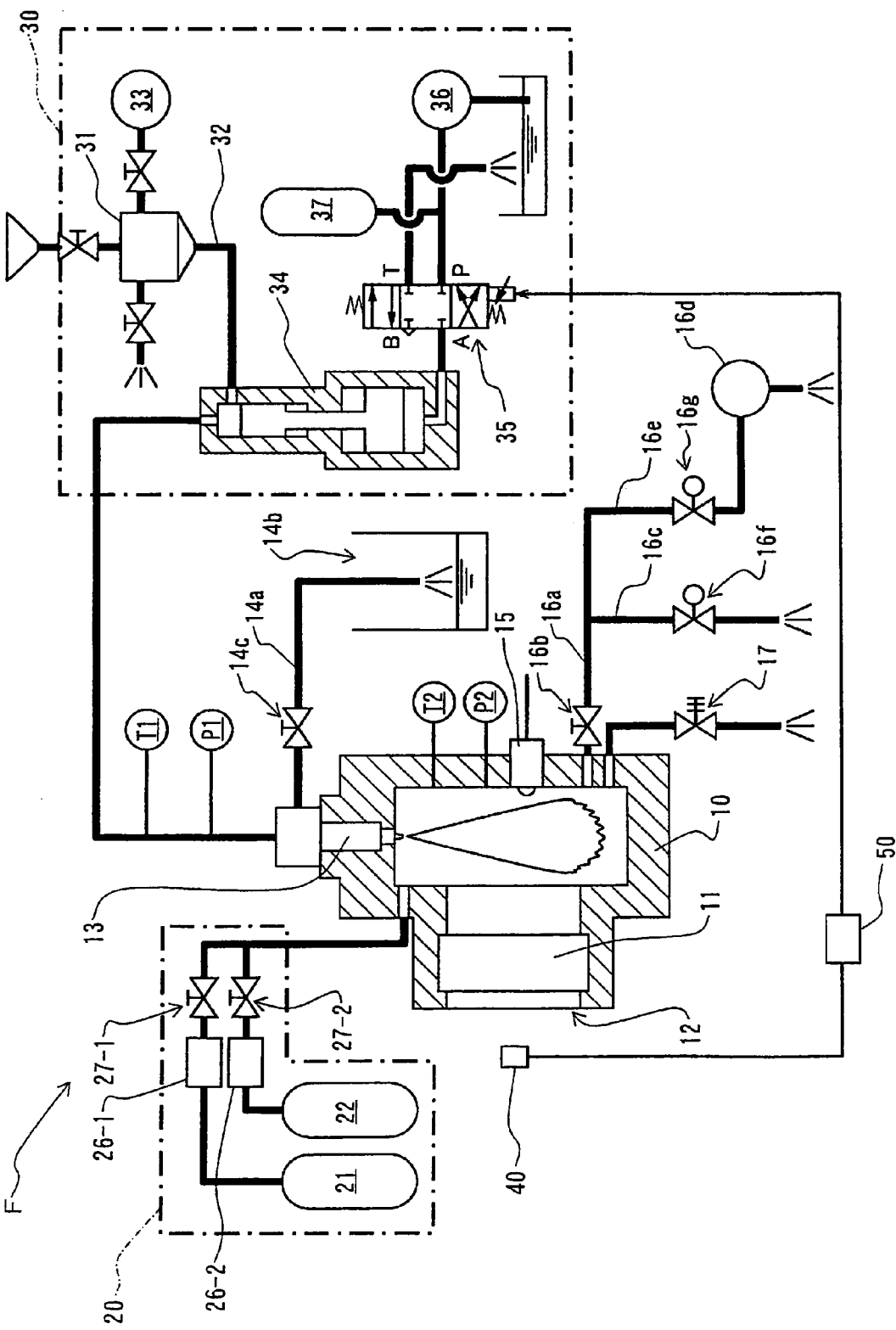
FIG. 1 An outline schematic diagram of a fuel quality evaluation apparatus according to an embodiment of the invention.

F Fuel quality evaluation method
10 Combustion Chamber
11 Quartz Glass
12 Observation Window
13 Injection nozzle
15 Spark plug
16 Exhaust Pipe
17 Exhaust Valve
18 Vacuum Pump
20 Preliminary combustion adjustment section
21 Adjustment gas tank
22 Ethylene gas tank
23 Adjustment gas supply pipe
24 Ethylene gas supply pipe
25 Mixer
26-1 First mass flow controller
26-2 Second mass flow controller
27-1 First control valve
27-2 Second control valve
30 Fuel supply section
31 Fuel tank
32 Fuel supply pipe
33 Fuel pump
34 Electromagnetic valve
35 Oil pump
36 Accumulator
40 Photo-sensor 42 Mirror
50 Controller
T1 Fuel temperature sensor
P1 Fuel pressure sensor
T2 Temperature sensor for combustion chamber
P2 Pressure sensor in combustion chamber

BEST MODE FOR CARRYING OUT THE INVENTION

A fuel quality evaluation apparatus and a fuel quality evaluation method of the invention cause a combustion of a fuel, which is a subject of inspection, inside a combustion chamber which causes a combustion of a fuel, measure a light intensity of a flame appearing in conjunction with the combustion with light intensity measurement means, and evaluate a quality of the fuel based on a variation in a flame light intensity transformation for each combustion.

That is, the inventor, being aware that while a combustion condition of each combustion is stable in the event that the quality of the fuel is good, a combustion condition of each combustion is unstable in the event that the quality of the fuel is bad, detects this by means of the variation in the flame light intensity transformation, and applies it to a fuel quality evaluation.

Furthermore, the inventor, being aware that while the combustion of the fuel is unlikely to be affected by a temperature inside the combustion chamber in the event that the quality of the fuel is good, the combustion of the fuel is easily affected by the temperature inside the combustion chamber in the event that the quality of the fuel is bad, has improved a reliability of the quality evaluation by utilizing this.

Consequently, when evaluating the quality of the fuel, it being at least unnecessary to photograph the flame appearing due to the combustion, as it is sufficient to detect only the light intensity of the flame, it is possible to achieve a low cost evaluation apparatus which evaluates the quality of the fuel.

Hereafter, an embodiment of the invention will be described in detail, based on the drawings. FIG. 1 is an outline schematic diagram of a fuel quality evaluation apparatus F of the embodiment.

The fuel quality evaluation apparatus F is configured of a combustion chamber 10, in one portion of a peripheral wall of which is provided an observation window 12 on which is mounted a crystal glass 11, a preliminary combustion adjustment section 20 for bringing about a preliminary combustion for adjusting a temperature inside the combustion chamber 10, a fuel supply section 30 which supplies a fuel to be inspected into the combustion chamber 10, a Photo-sensor 40, which is light intensity measurement means which measures a light intensity of a flame appearing inside the combustion chamber 10, and a controller 50 equipped with analysis means which, as well as controlling the preliminary combustion adjustment section 20 and fuel supply section 30, as well as the Photo-sensor 40, carries out an analysis for a fuel quality evaluation.

The combustion chamber 10, in the embodiment, is taken to be a stainless steel base having a cylindrically shaped combustion space of inner diameter 120 mm and height 300 mm, an injection nozzle 13, which injects the fuel, is mounted on an upper portion of the combustion chamber 10, and the fuel is injected by means of the injection nozzle 13 from an upper side toward a lower side. In FIG. 1, 14a is a drainpipe for ejecting excess fuel among the fuel supplied from the fuel supply section 30 to the injection nozzle 13, 14b is a drain tank for stocking the fuel ejected by the drainpipe 14a, and 14c is an on-off valve.

A spark plug 15 being mounted in the peripheral wall of the combustion chamber 10, the spark plug 15 is connected to an unshown igniter. The spark plug 15 is for igniting a mixed gas supplied to the combustion chamber 10 by the preliminary combustion adjustment section 20, to be described hereafter.

Also, an exhaust pipe 16a for expelling a combustion gas inside the combustion chamber 10 being connected to the combustion chamber 10, an exhaust control valve 16b, which switches between an expulsion condition in which the combustion gas is being expelled and a non-expulsion condition in which the combustion gas is not being expelled, is provided in the exhaust pipe 16a, approximated to the combustion chamber 10.

The exhaust pipe 16a being caused to diverge into a natural exhaust pipe 16c, which carries out a natural expulsion utilizing a high pressure condition inside the combustion chamber 10, and a forced exhaust pipe 16e for carrying out a forced expulsion by means of a vacuum pump 16d, in particular, a combustion residue inside the combustion chamber 10 is, as far as possible, prevented from remaining due to a forced expulsion of the combustion gas inside the combustion chamber 10 by means of the vacuum pump 16d.

In FIG. 1, 16f being a first on-off valve for switching, provided in the natural exhaust pipe 16c, and 16g a second on-off valve for switching, provided in the forced exhaust pipe 16e, it is possible to efficiently and swiftly expel the combustion gas inside the combustion chamber 10 by means of an on-off control of the first on-off valve for switching 16f and second on-off valve for switching 16g. Also, in FIG. 1, 17 is a safety valve provided on the combustion chamber 10.

Furthermore, in FIG. 1, T1 is a fuel temperature sensor which measures a temperature of the fuel injected from the injection nozzle 13, P1 is a fuel pressure sensor which measures a pressure of the fuel injected from the injection nozzle 13, T2 is a temperature sensor for combustion chamber which measures a temperature of an interior of the combustion chamber 10, and P2 is a pressure sensor in combustion chamber which measures a pressure of the interior of the combustion chamber 10.

The preliminary combustion adjustment section 20 is temperature control means for adjusting the temperature and an atmosphere inside the combustion chamber 10 to a predetermined condition by causing a combustion to occur inside the combustion chamber 10.

The preliminary combustion adjustment section 20 is equipped with an adjustment gas tank 21, in which is stocked an adjustment gas consisting of oxygen combined with nitrogen, and an ethylene gas tank 22, in which is stocked ethylene gas.

As well as the adjustment gas in the adjustment gas tank 21 being fed to the combustion chamber 10 via an adjustment gas supply pipe 23, the ethylene gas in the ethylene gas tank 22 is fed to the combustion chamber 10 via an ethylene gas supply pipe 24, and a mixed gas in which are mixed oxygen, nitrogen and ethylene is generated in the combustion chamber 10.

A flow rate of the adjustment gas being made adjustable in the adjustment gas supply pipe 23 by providing a first mass flow controller 26-1 and a first control valve 27-1, a flow rate of the ethylene gas is made adjustable in the ethylene gas supply pipe 24 by providing a second mass flow controller 26-2 and a second control valve 27-2. In the embodiment, the adjustment gas is taken to be a mixed gas of 34% oxygen and 66% nitrogen.

A fuel supply section 30 is equipped with a fuel tank 31 which stocks a fuel which is a subject of inspection. The fuel inside the fuel tank 31 can be supplied via a fuel supply pipe 32 to the injection nozzle 13.

In particular, a compressor 33, which pressurizes an interior of the fuel tank 31, being connected to the fuel tank 31, and a fuel pump 34, which is injection control means, being interposed in the fuel supply pipe 32, it is possible to supply the fuel pressurized at a predetermined pressure. In the embodiment, hydraulic oil is supplied to the fuel pump 34, via an electromagnetic valve 35, from an oil pump 36 and an accumulator 37, achieving a stabilizing of the fuel injection at the injection nozzle 13.

The Photo-sensor 40 being light intensity measurement means configured of a photodiode, it receives light of the flame accompanying the combustion, and enables an output of a signal in accordance with the light intensity. By using the Photo-sensor 40, it being possible to increase a temporal resolution, it is possible to carry out a more accurate measurement. Although only one Photo-sensor 40 is used in the embodiment, it is also acceptable to dispose a plurality of Photo-sensors 40 and, where necessary, it is also acceptable to appropriately dispose an image recording instrument, such as a high speed camera. Also, it also being acceptable to dispose a plurality of high speed cameras too, in particular, as the flame appearing in conjunction with the combustion inside the combustion chamber 10 is comparatively elongated, it is also acceptable to dispose a plurality of high speed cameras in a longitudinal direction of the flame, enabling a more detailed observation of the combustion condition.

Figure 2:
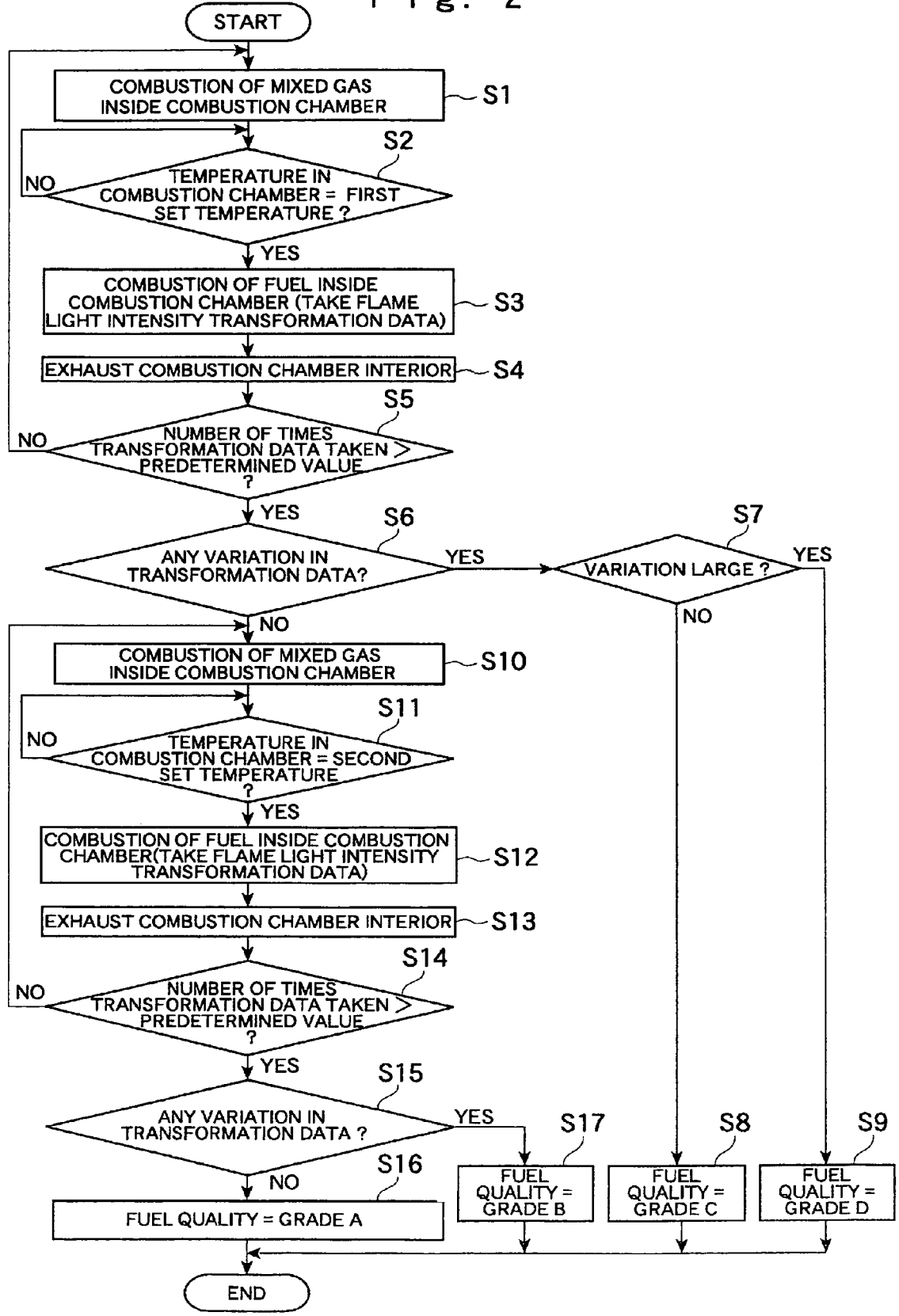
FIG. 2 A flowchart of an evaluation process of the fuel quality evaluation apparatus according to the embodiment of the invention.

The controller 50, controlling the fuel quality evaluation apparatus F based on a necessary program, carries out a fuel quality evaluation in the way below, as shown in the flowchart of FIG. 2. Herein, it is taken that the fuel which is the subject of inspection is already stocked in the fuel tank 31 of the fuel quality evaluation apparatus F.

Firstly, the controller 50 of the fuel quality evaluation apparatus F causes the mixed gas in which are mixed oxygen, nitrogen and ethylene to combust in the combustion chamber 10 (step S1), filling the interior of the combustion chamber 10 with a simulated air of a predetermined temperature and pressure.

That is, the controller 50, controlling the first control valve 27-1 and second control valve 27-2, feeds a predetermined amount of each of the adjustment gas and the ethylene gas to the combustion chamber 10, generating the mixed gas inside the combustion chamber 10, and transmits a signal to the igniter causing the spark plug 15 to operate, and causing the mixed gas to combust.

Figure 3:
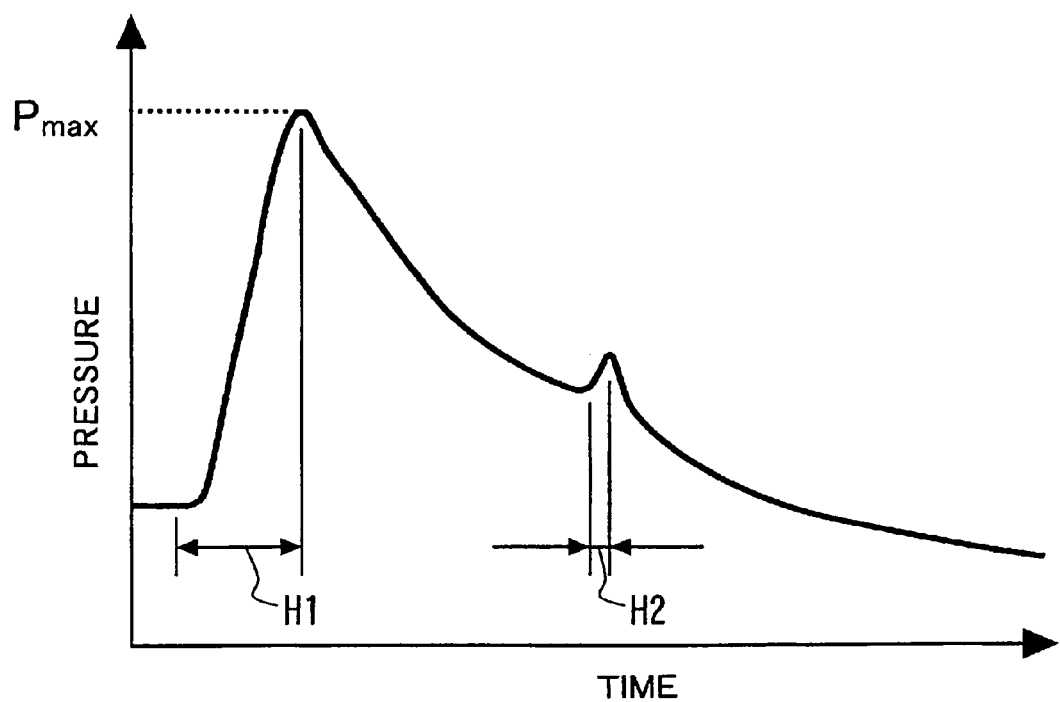
FIG. 3 A figure showing a combustion chamber interior pressure transition.

On the mixed gas combusting, as shown in a figure showing a combustion chamber 10 interior pressure transition of FIG. 3, the pressure in the interior of the combustion chamber 10 increases. In FIG. 3, H1 shows a first combustion period in which the mixed gas is combusting. Herein, in a simulated air generated in conjunction with the combustion of the mixed gas, in the embodiment, it is arranged in such a way that oxygen exists at around 21%. An amount of oxygen in the simulated air can be appropriately adjusted by adjusting an amount of oxygen included in the adjustment gas, and a compounding ratio of the adjustment gas and ethylene gas.

Subsequently, the controller 50 gradually reduces the temperature of the interior of the combustion chamber 10 by controlling the exhaust control valve 16b and first on-off valve for switching 16f, reducing the pressure of the interior of the combustion chamber 10.

At a point at which the temperature of the interior of the combustion chamber 10 has dropped, reaching a set temperature (step S2: Yes), the controller 50, carrying out a switching control of the electromagnetic valve 35, causes the fuel pump 34 to operate, injecting the fuel from the injection nozzle 13 into the combustion chamber 10. In the embodiment, the fuel is injected at a point at which the temperature of the interior of the combustion chamber 10 reaches around 720K.

Figure 4:
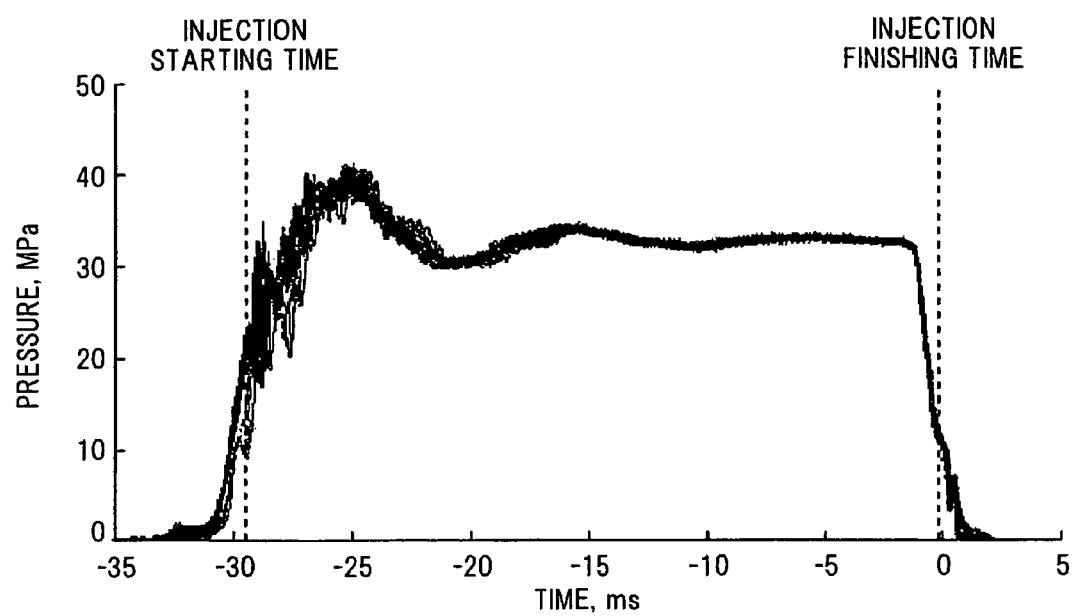
FIG. 4 A figure showing an injection nozzle fuel pressure transition.

The fuel is stably supplied to the injection nozzle 13 by the fuel pump 34. In particular, in the embodiment, as shown in a figure showing an injection nozzle 13 fuel pressure transition of FIG. 4, it is constantly possible to inject while stably maintaining an injection pressure.

In conjunction with the injection of the fuel into the combustion chamber 10, the fuel self-ignites due to the atmosphere of the interior of the combustion chamber 10, starting the combustion. In FIG. 3, H2 shows a second combustion period in which the fuel is combusting.

By the Photo-sensor 40 detecting the light intensity of the flame appearing due to the combustion of the fuel, and inputting a signal in accordance with the light intensity of a detection result into the controller 50, the controller 50 carries out a taking of flame light intensity transformation data (step S3).

After the combustion finishes, the controller 50 opens the exhaust control valve 16b and first on-off valve for switching 16f, naturally expelling the combustion gas inside the combustion chamber 10, and next, opens the second on-off valve for switching 16g as well as opening the first on-off valve for switching 16f, forcibly expelling the combustion gas inside the combustion chamber 10 with the vacuum pump 16d (step S4).

After the combustion gas has been expelled from the combustion chamber 10, the controller 50 determines whether a number of times of taking the flame light intensity transformation data has reached a predetermined number of times (step S5).

If the number of times of taking the data has not reached the predetermined number of times (step S5: No), the controller 50 returns to step S1, and carries out a retaking of the flame light intensity transformation data.

In this way, the controller 50 executes the combustion of the fuel a plurality of times at a first set temperature, and takes the flame light intensity transformation data for each combustion. In the embodiment, the number of times of taking the flame light intensity transformation data is taken to be three. It is desirable that the number of times of taking the flame light intensity transformation data is three or more.

Figure 5:
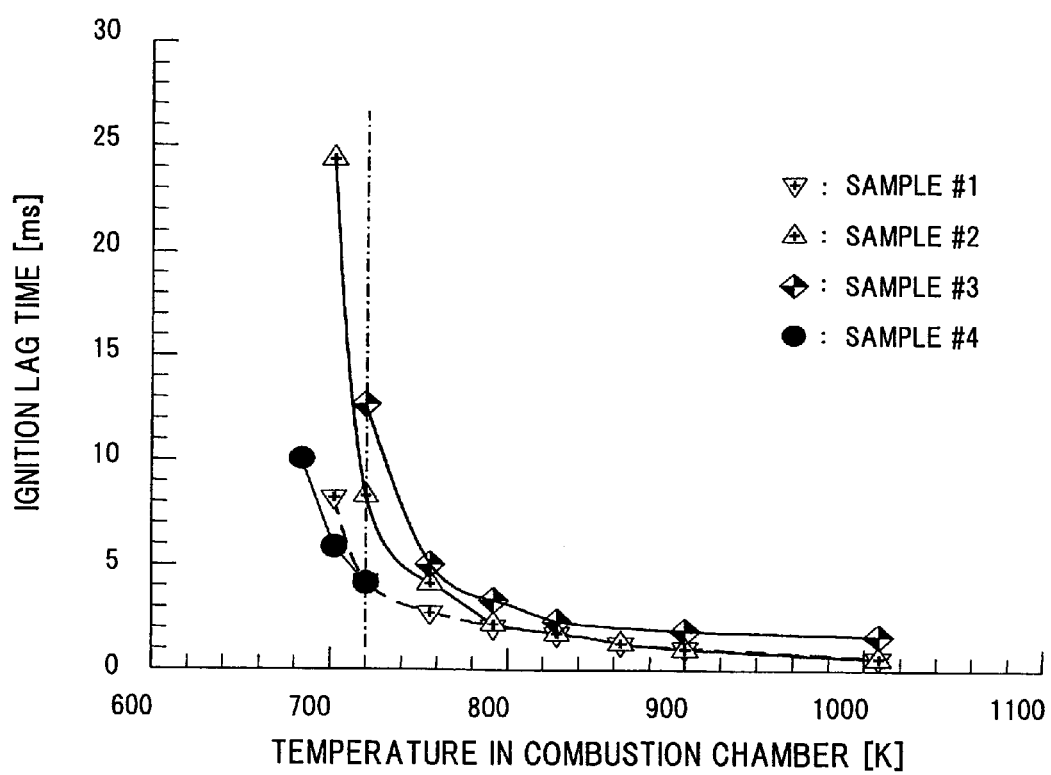
FIG. 5 A figure showing a correlation between a combustion chamber interior temperature and an ignition lag time.

Herein, in the embodiment, although the fuel is caused to combust with the temperature of the interior of the combustion chamber 10 at 720K, in the fuel quality evaluation apparatus F of the embodiment, when measuring an ignition lag time for samples #1 to #4 of fuel while causing the temperature of the interior of the combustion chamber 10 to differ, as a noticeable increase in the ignition lag time is seen with approximately 720K as a border, as shown in FIG. 5, this temperature is taken as the first set temperature.

As a temperature corresponding to the first set temperature varies depending on a shape and capacity of the combustion chamber 10, or on characteristics of the injection nozzle 13, in the fuel quality evaluation apparatus, it is desirable to set an appropriate first set temperature in each fuel quality evaluation apparatus.

It is desirable that the first set temperature is decided on by causing the sample fuels to combust while causing the temperature of the interior of the combustion chamber 10 to differ, measuring the ignition lag times, and compiling the figure shown in FIG. 5. Herein, by using at least two kinds of fuel known to be conforming articles, and fuel known to be non-conforming articles, as fuels which are to be the samples, it is possible to make it easier to decide on the first set temperature.

The measurement of the ignition lag time, in the embodiment, being done using the fuel quality evaluation apparatus F, by detecting the flame with the Photo-sensor 40 through the observation window 12 of the combustion chamber 10, a time from an injection timing, when the fuel is injected, to an ignition timing, when the fuel is ignited, is measured. Rather than the Photo-sensor 40, it is also acceptable to photograph the flame with a high speed camera, and measure the ignition lag time from a photographic image.

After taking the flame light intensity transformation data the predetermined number of times (step S5: Yes), the controller 50 carries out a variation evaluation of the acquired transformation data (step S6).

Figure 6:
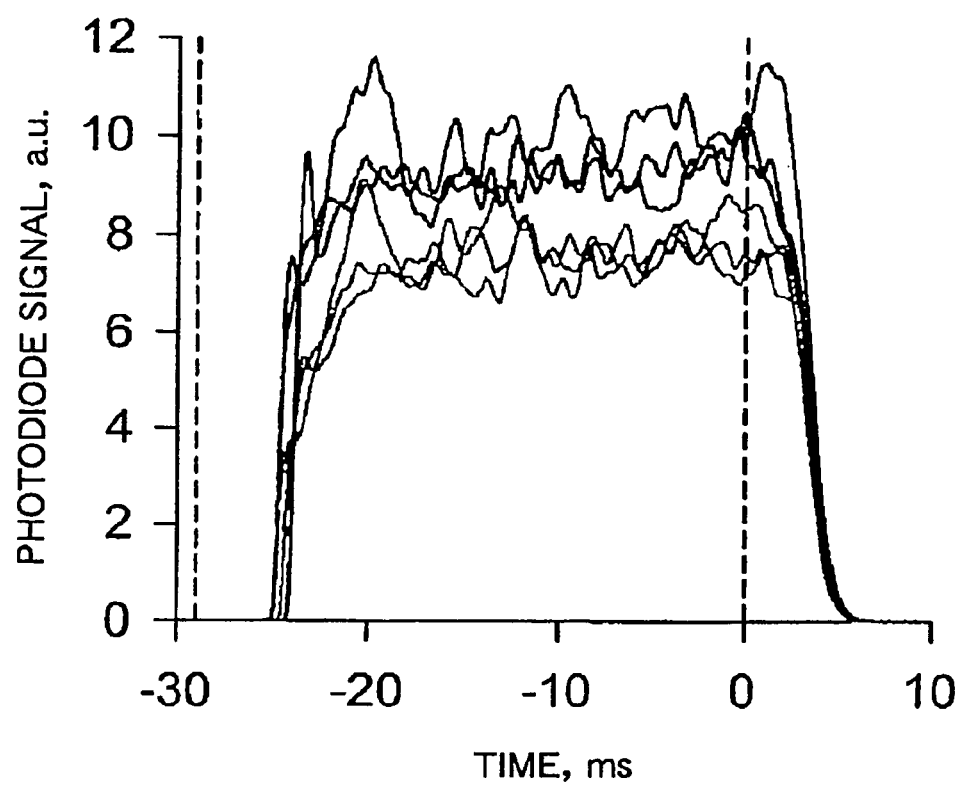
FIG. 6 A figure showing a flame light intensity transformation.

Herein, the flame light intensity transformation data forming the curves shown in FIG. 6, in the event that the quality of the fuel is good, a curve is acquired in which a starting time of the combustion expressed as an increase in the light intensity, and a finishing time of the combustion expressed as a decrease in the light intensity, are almost the same, as shown in FIG. 6. In the embodiment, a time "0 ms" being taken as a finishing time of the fuel's injection from the injection nozzle 13, a starting time of the fuel's injection from the injection nozzle 13 is taken to be "−29 ms".

Figure 7:
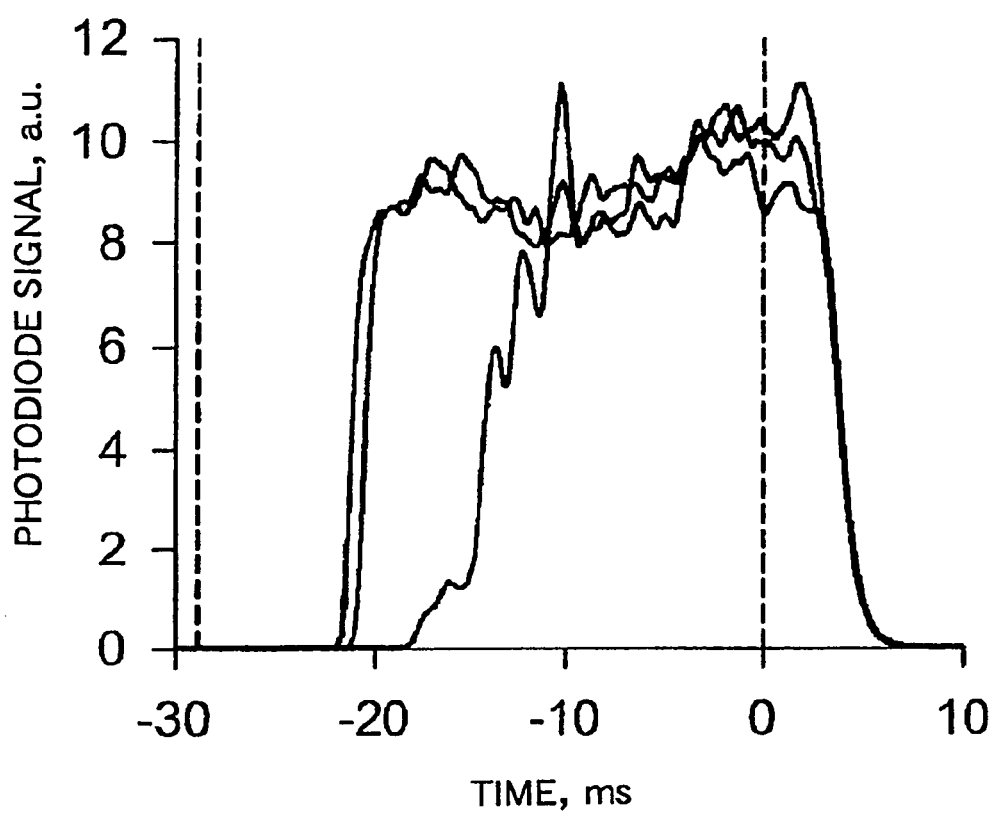
FIG. 7 A figure showing a flame light intensity transformation for a fuel evaluated as grade C.
Figure 8:
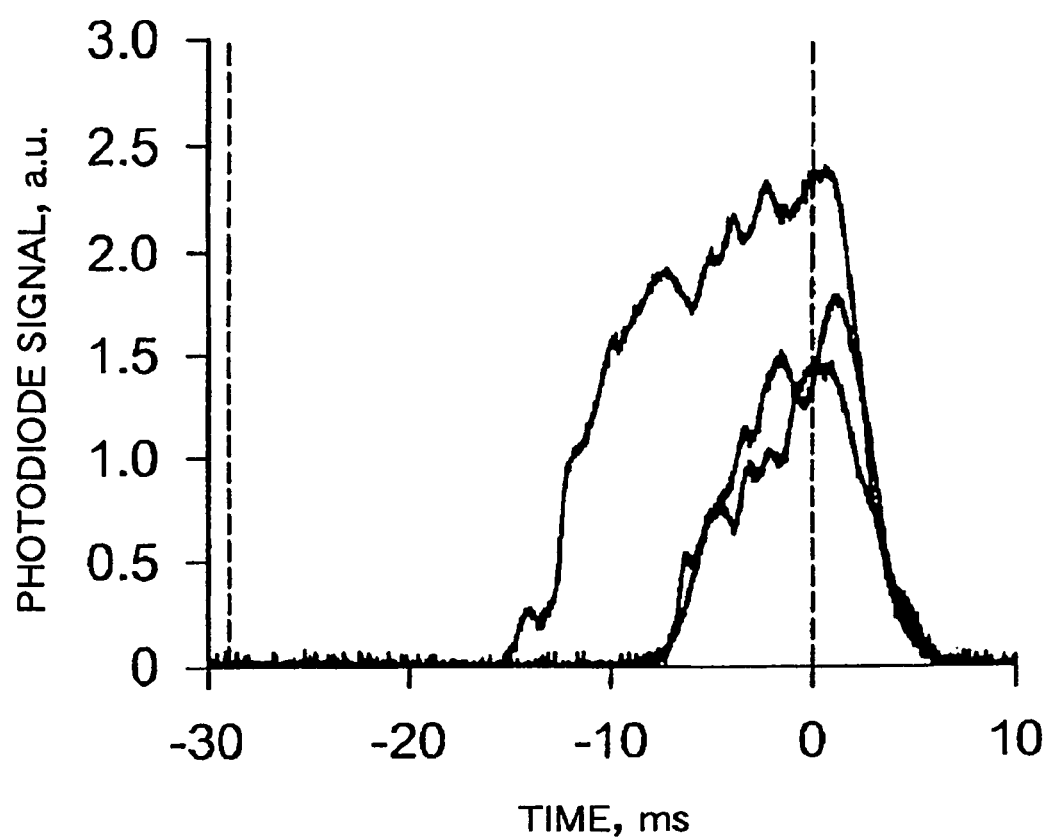
FIG. 8 A figure showing a flame light intensity transformation for a fuel evaluated as grade D.

In the event that the quality of the fuel is not good, a considerable variation occurs in the transformation data, as shown in FIGS. 7 and 8.

In the embodiment, the controller 50, by counting a number of items of transformation data for which a strength of an output signal from the Photo-sensor 40 at a time of "−20 ms" is not equal to or greater than a predetermined strength (hereafter referred to simply as "abnormal transformation data"), determines a degree of variation in the transformation data. Herein, the predetermined strength is taken to be 50% of a maximum strength of the output signal of the Photo-sensor 40.

A method of determining the degree of variation in the transformation data not being limited to this determination method, as long as it is a method capable of determining the degree of variation in the transformation data, it is acceptable to use any kind of method. For example, it is also acceptable to calculate a rate of change of the light intensity immediately after the start of combustion, calculate a standard deviation of the rate of change of the light intensity of each combustion, determine that the quality of the fuel is good in the event that a value of the standard deviation is smaller than a predetermined reference value, and determine that the quality of the fuel is bad in the event that the value of the standard deviation is greater than the predetermined reference value.

The controller 50, in the event that the number of items of abnormal transformation data is zero, determines that there is no variation (step S6: No), and in the event that the number of items of abnormal transformation data is one or more, it determines that there is a variation (step S6: Yes).

Furthermore, it is taken that the controller 50, in the event that the number of items of abnormal transformation data is only one, determines that the variation is small (step S7: No), and evaluates the quality of the inspected fuel as "grade C" (step S 8).

Meanwhile, in the event that the number of items of abnormal transformation data is two or more, it is taken that the controller 50 determines that the variation is large (step S7: Yes), and evaluates the quality of the inspected fuel as "grade D" (step S9).

The controller 50, in the event of determining in step S6 that there is no variation in the transformation data, makes the temperature at which the fuel is caused to combust a second set temperature, which is a lower temperature than the first set temperature, causes the fuel to combust at the second set temperature, and retakes the flame light intensity transformation data.

That is, with the controller 50, the mixed gas is caused to combust inside the combustion chamber 10 (step S10), the interior of the combustion chamber 10 is filled with a simulated air of a predetermined temperature, and at a point at which the temperature of the interior of the combustion chamber 10 reaches the second set temperature (step S11: Yes), the fuel is injected from the injection nozzle 13 into the combustion chamber 10, and the fuel is caused to self-ignite due to an atmosphere inside the combustion chamber 10. In the embodiment, the second set temperature is taken to be around 702K.

By the Photo-sensor 40 detecting the light intensity of the flame appearing due to the combustion of the fuel, and inputting a signal in accordance with the light intensity of a detection result into the controller 50, the controller 50 takes flame light intensity transformation data (step S12).

After the combustion finishes, the controller 50 opens the exhaust control valve 16b and first on-off valve for switching 16f, naturally expelling the combustion gas inside the combustion chamber 10, and next, opens the second on-off valve for switching 16g as well as opening the first on-off valve for switching 16f, forcibly expelling the combustion gas inside the combustion chamber 10 with the vacuum pump 16d (step S13).

After the combustion gas has been expelled from the combustion chamber 10, the controller 50 determines whether a number of times of taking the flame light intensity transformation data has reached the predetermined number of times (step S14).

If the number of times of taking the data has not reached the predetermined number of times (step S14: No), the controller 50 returns to step S10, and carries out a retaking of the flame light intensity transformation data.

In this way, the controller 50 executes the combustion of the fuel a plurality of times at the second set temperature, and takes the flame light intensity transformation data for each combustion. In the embodiment, the number of times of taking the flame light intensity transformation data is taken to be three. It is desirable that the number of times of taking the flame light intensity transformation data is three or more.

In the embodiment, although the fuel is caused to combust with the temperature of the interior of the combustion chamber 10 at 702K, it being sufficient that it is a lower temperature than the first set temperature, desirably, it is a temperature around 10 to 30K lower than the first set temperature.

After taking the flame light intensity transformation data the predetermined number of times (step S14: Yes), the controller 50 carries out a variation evaluation of the acquired transformation data (step S15).

Here too, the controller 50, by counting a number of items of abnormal transformation data for which the strength of the output signal from the Photo-sensor 40 at the time of "−20 ms" is not equal to or greater than the predetermined strength, determines a degree of variation in the transformation data. The predetermined strength is taken to be 50% of the maximum strength of the output signal of the Photo-sensor 40.

Figure 9:
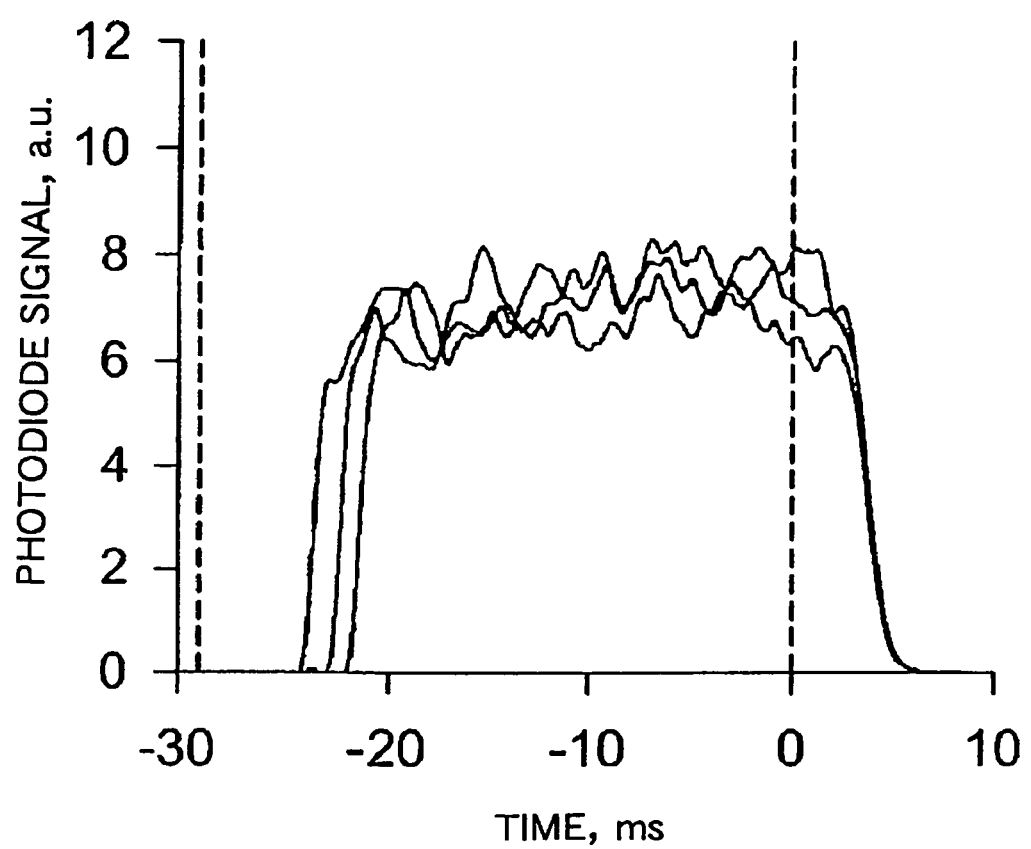
FIG. 9 A figure showing a flame light intensity transformation for a fuel evaluated as grade A.

It is taken that the controller 50, in the event that the number of items of abnormal transformation data is zero, as shown in FIG. 9, determines that there is no variation (step S15: No), and evaluates the quality of the inspected fuel as "grade A" (step S16).

Figure 10:
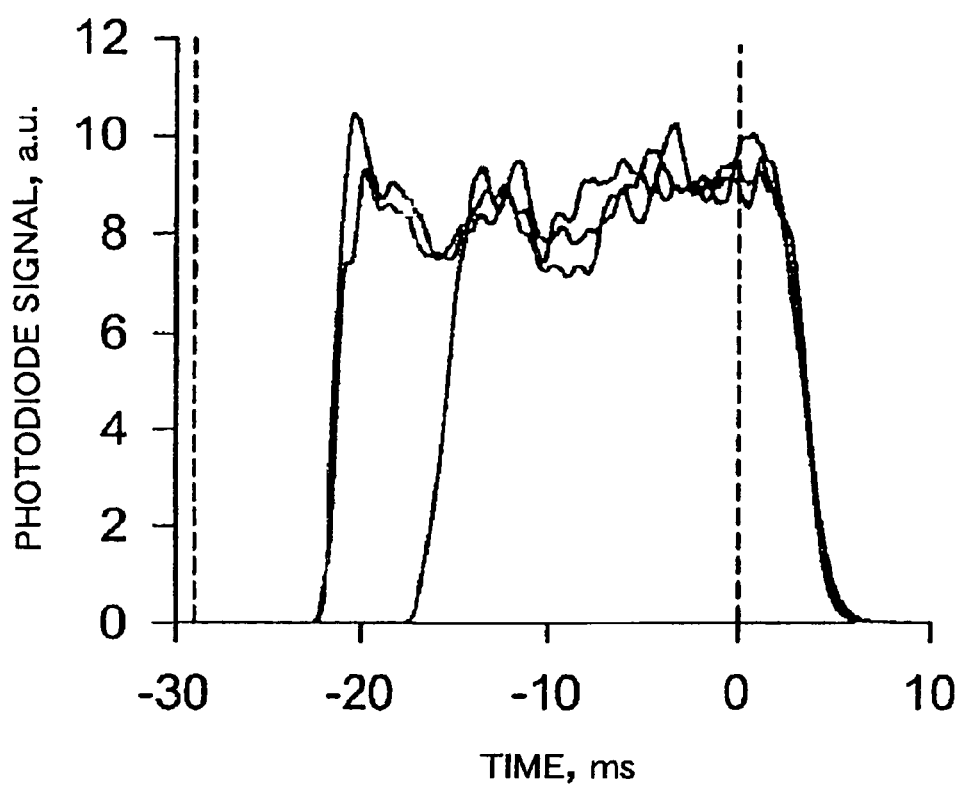
FIG. 10 A figure showing a flame light intensity transformation for a fuel evaluated as grade B.

Meanwhile, in the event that the number of items of abnormal transformation data is one or more, as shown in FIG. 10, it is taken that the controller 50 determines that there is a variation (step S15: Yes), and evaluates the quality of the inspected fuel as "grade B" (step S17).

In the embodiment, grade A being a highest quality of fuel, the quality worsens in an order of grade B, grade C and grade D.

In this way, by the fuel quality evaluation apparatus F carrying out the quality evaluation utilizing the variation in the flame light intensity transformation data for the combustion, acquired when causing the fuel to combust with the temperature of the interior of the combustion chamber 10 at the first set temperature, it is possible to carry out an evaluation with a high reliability.

In particular, even in the event that there is no variation in the flame light intensity transformation data with the combustion at the first set temperature, the fuel quality evaluation apparatus F, by causing the fuel to combust at the second set temperature, which is lower than the first set temperature, and confirming the variation in the flame light intensity transformation data, can evaluate the quality of the fuel with a greater accuracy.

The heretofore described flame light intensity transformation data variation evaluation standard, and fuel quality grading determination standard, are examples and, not being limited to these, it is acceptable to adjust appropriately as necessary.

Although, in the embodiment, the fuel quality evaluation is carried out utilizing the variation in the flame light intensity transformation data, in a case, for example, in which it is possible to use a high speed camera, it is possible to photograph an ignition point of the fuel with the high speed camera, and carry out the fuel quality evaluation from an image of the ignition point.

That is, it is recognized that as a fuel of a good quality ignites easily, it ignites from a position comparatively close to the injection nozzle 13, while a fuel which is not of a good quality, not igniting easily, has a tendency to ignite from a position away from the injection nozzle 13.

Consequently, it is also possible to measure a distance of the ignition position from the injection nozzle 13 using the image of the ignition point, and carry out the fuel quality evaluation utilizing the distance.

In particular, in the case of evaluating the fuel quality utilizing the variation in the flame light intensity transformation data, it being necessary to cause a specimen fuel to combust a minimum of twice, as it is necessary to increase the number of combustion times of the specimen fuel as far as possible in order to increase the evaluation accuracy, time is needed for the evaluation.

Therein, roughly evaluating the quality of the fuel utilizing the ignition point of the fuel, by finishing an evaluation operation for a fuel of which the quality is evaluated as being clearly not good in the rough evaluation at that point, it is possible to greatly reduce the time needed for the evaluation.

Herein, with the evaluation using the fuel ignition point, the controller 50 determines the ignition lag time from light intensity transition data acquired from the light intensity signal input from the Photo-sensor 41, and information on an injection starting time at which the injection of the fuel from the injection nozzle 13 is started. Also, the controller 50 calculates the rate of change of the light intensity immediately after the start of combustion from the light intensity transition data.

Figure 11:
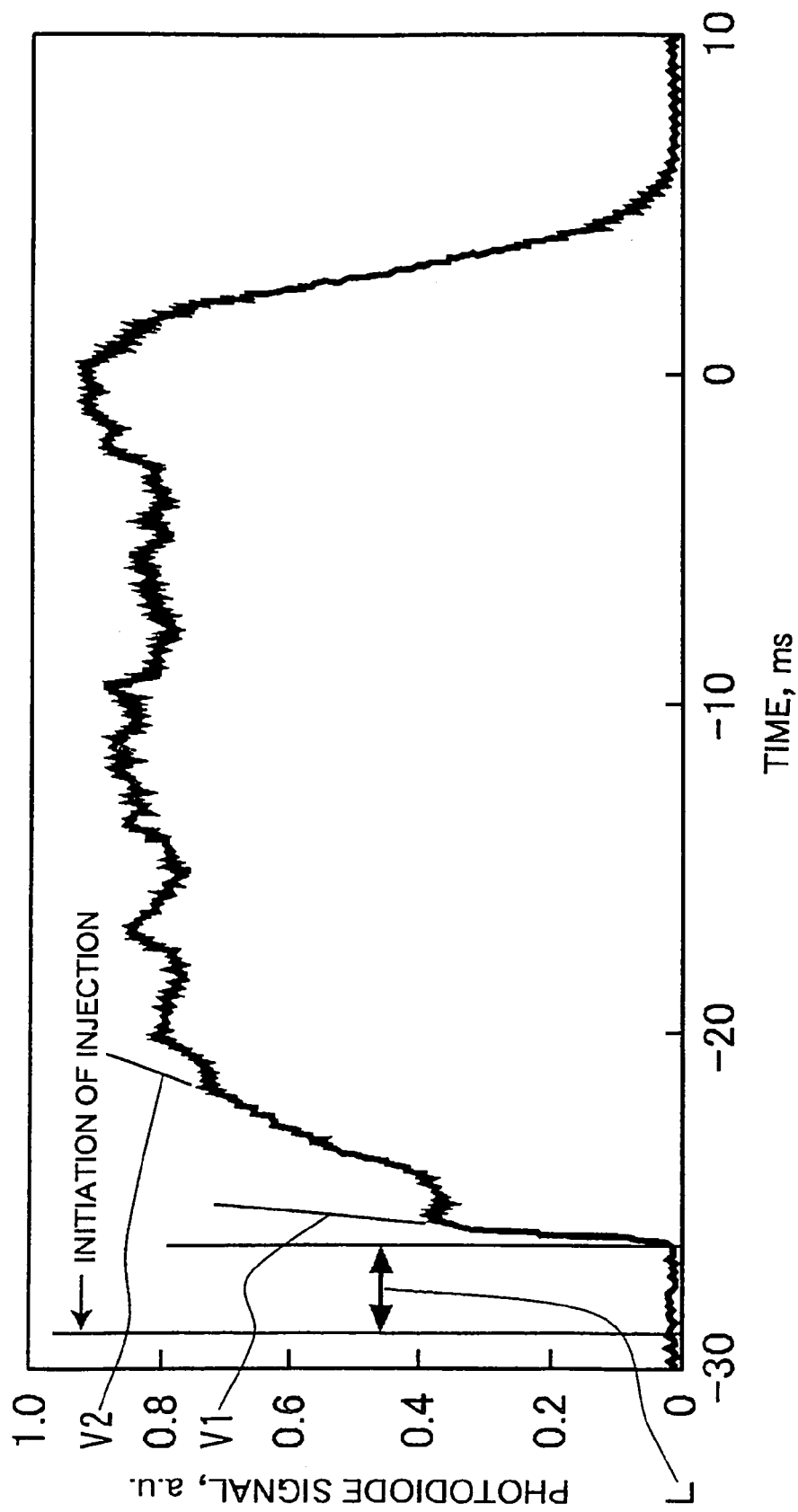
FIG. 11 A figure showing a light intensity transition at a combustion duration of a fuel of a good quality.
Figure 12:
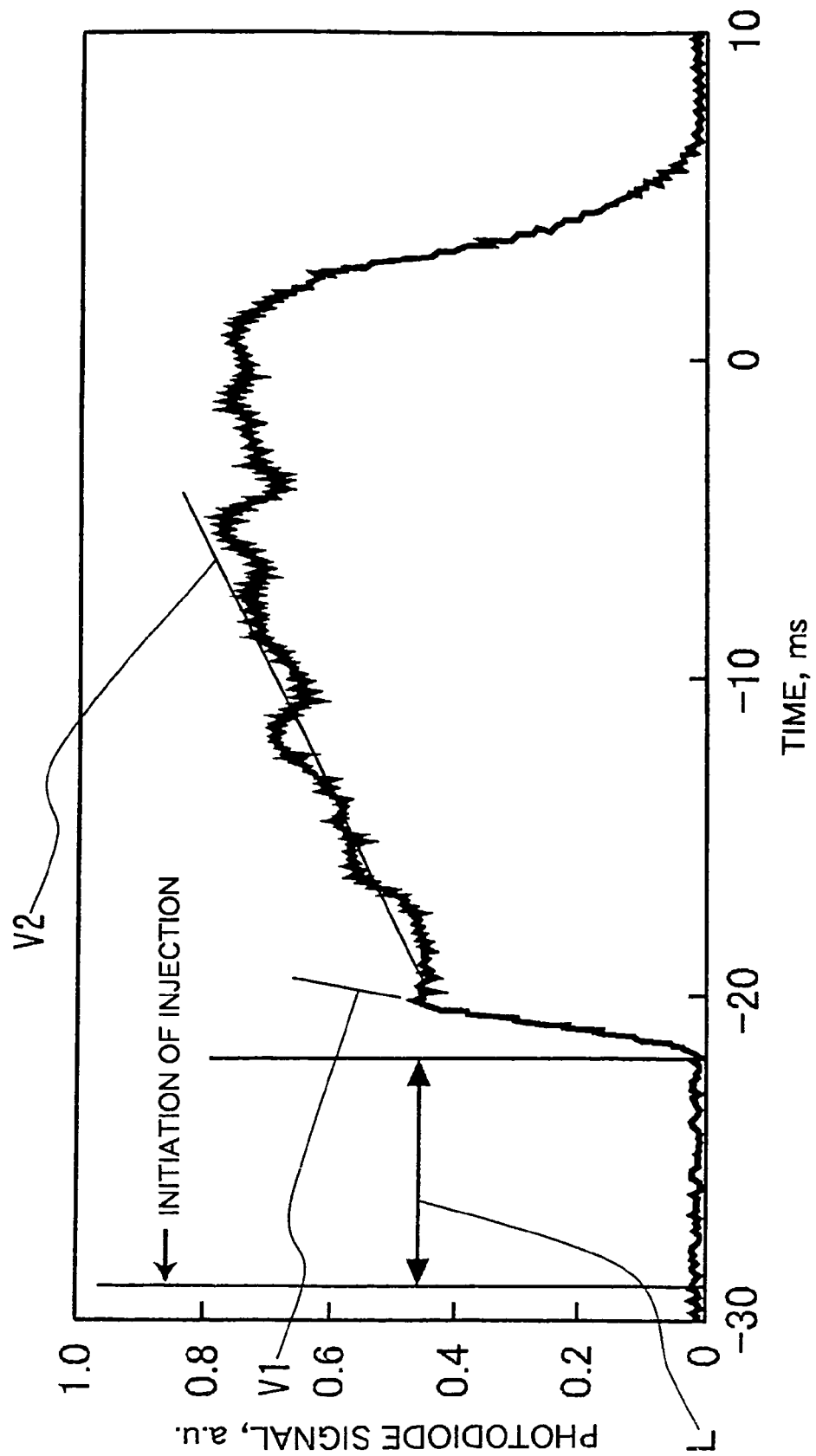
FIG. 12 A figure showing a light intensity transition at a combustion duration of a fuel which is not of a good quality.

An ignition lag time L being short, as shown in FIG. 11, in the case of causing the combustion of a good quality fuel, and the ignition lag time L being longer, as shown in FIG. 12, in the case of causing the combustion of a fuel which is not of a good quality, it is possible to decide in advance on an ignition lag time which is to be a threshold value, and judge a fuel for which the ignition lag time L is longer than the threshold value ignition lag time to be a fuel which is not of a good quality.

Furthermore, the inventor also being aware that, by focusing on the rate of change of the light intensity rather than on the ignition lag time L of the fuel, it is possible to accurately implement the fuel quality evaluation, most simply, as it is possible to evaluate as a conforming article in the event that the rate of change of the light intensity immediately after the start of combustion (an inclination of a first hypothetical line V1 in FIGS. 11 and 12) is large, and to evaluate as a non-conforming article in the event that the rate of change of the light intensity is small, by using the ignition lag time L and the rate of change of the light intensity immediately after the start of combustion, it is possible to more accurately make the rough evaluation of the quality of the fuel. Herein, the rough evaluation is an evaluation carried out without utilizing the variation in the flame light intensity transformation data.

Furthermore, with the rough evaluation, by detecting not only a first light intensity rate of change (the inclination of the first hypothetical line V1 in FIGS. 11 and 12), which is the rate of change of the light intensity immediately after the start of combustion, but also, after the light intensity has increased at the first light intensity rate of change, a second light intensity rate of change (an inclination of a second hypothetical line V2 in FIGS. 11 and 12), wherein the light intensity increases at a rate of change smaller than the first light intensity rate of change, and utilizing the second light intensity rate of change size too, it is possible to increase the accuracy of the rough evaluation.

That is, the better the quality of the fuel the higher being the combustibility, as the second light intensity rate of change has a tendency to become larger the better the quality of the fuel, it is possible to evaluate as a conforming article in the event that the second light intensity rate of change is large, and to evaluate as a non-conforming article in the event that the second light intensity rate of change is small.

In this way, as well as being possible to further increase the evaluation accuracy by evaluating the quality of the fuel utilizing the variation in the flame light intensity transformation data, while also using the ignition lag time, the first light intensity rate of change, and the second light intensity rate of change, it is possible, by swiftly carrying out a detection of a completely non-conforming fuel which is inappropriate for use, and preventing a carrying out of an unnecessary fuel combustion, to achieve an increase in an operating efficiency.

Furthermore, in the case of photographing the combustion condition of the fuel with a high speed camera, it being possible to measure an ignition distance, which is the distance from the injection nozzle 13 of the ignition point when the fuel ignites, the shorter the ignition distance, the more immediately after the injection from the injection nozzle 13 the fuel igniting, as it is possible to judge that the quality of the fuel is high, it is also acceptable to carry out the rough evaluation utilizing data on the ignition distance too, or utilizing at least any one of the ignition lag time, the first light intensity rate of change, the second light intensity rate of change, and the ignition distance.

In the rough evaluation too, it also being acceptable, causing the combustion of the fuel with the temperature of the interior of the combustion chamber 10 caused to differ, to carry out the measurement of the ignition lag time, the first light intensity rate of change, the second light intensity rate of change, and the ignition distance, it is possible to further increase the evaluation accuracy by utilizing measurement results thereof.

INDUSTRIAL APPLICABILITY

With the fuel quality evaluation apparatus and fuel quality evaluation method of the invention of the invention, it being possible to reliably carry out a heavy oil C quality evaluation, it is possible to prevent a damage occurring due to using a defective heavy oil C in a marine diesel engine, and it is possible to avoid a risk of a damage to the marine diesel engine.

The invention claimed is:

1. A fuel quality evaluation apparatus comprising:
a combustion chamber which causes a fuel injected from an injection nozzle to combust;
a light intensity measurement means which measures a light intensity of a flame caused by a combustion in the interior of the combustion chamber; and
at least one processor and
a memory storing computer-readable instructions that cause the at least one processor to function as:
a temperature control means which adjusts a temperature of an interior of the combustion chamber before an injection of the fuel;
an injection control means which controls the injection of the fuel from the injection nozzle; and
an analysis means which analyzes a result of a measurement with the light intensity measurement means, and evaluates a quality of the fuel, wherein
the analysis means is configured, by controlling the temperature control means and the injection control means, to cause the fuel to combust a plurality of times with the interior of the combustion chamber at a predetermined temperature, to identify a transformation of a flame light intensity which increases along with an elapsing of time after a start of the combustion, and to evaluate the quality of the fuel based on a variation in the light intensity transformations for each combustion, and
the analysis means is also configured, in a case where there is no variation in the transformation of the flame light intensity, to cause the fuel to combust a plurality of times with the interior of the combustion chamber at a temperature lower than the predetermined temperature, to identify a transformation of a flame light intensity which increases along with an elapsing of time after a start of the combustion, and to evaluate the quality of the fuel based on a variation in the flame light intensity transformations for each combustion.

2. The fuel quality evaluation apparatus according to claim 1, wherein
the analysis means is configured, by controlling the temperature control means and the injection control means, to cause the fuel to combust a plurality of times with the interior of the combustion chamber at a first temperature, to cause the fuel to combust a plurality of times with the interior of the combustion chamber at a second temperature lower than the first temperature, and to evaluate the quality of the fuel based on a variation in the individual light intensity transformations for each combustion.

3. The fuel quality evaluation apparatus according to claim 1, wherein there is no variation in the flame light intensity transformation for each combustion at the predetermined temperature when a strength of the light intensity of the flame is greater than or equal to a predetermined strength.

4. The fuel quality evaluation apparatus according to claim 3, wherein the predetermined strength is 50% of a maximum strength of an output signal of the light intensity measurement means.

* * * * *